(12) United States Patent
Tracy et al.

(10) Patent No.: US 7,340,809 B2
(45) Date of Patent: Mar. 11, 2008

(54) SMART CLOSURE

(75) Inventors: Richard J. Tracy, Elgin, IL (US); Joseph Fabin, Elmwood Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/639,243

(22) Filed: Aug. 12, 2003

(65) Prior Publication Data

US 2004/0066291 A1    Apr. 8, 2004

Related U.S. Application Data

(60) Provisional application No. 60/403,932, filed on Aug. 16, 2002, provisional application No. 60/431,419, filed on Dec. 6, 2002.

(51) Int. Cl.
*A44B 11/25* (2006.01)
(52) U.S. Cl. .................................. 24/615; 200/61.58 B
(58) Field of Classification Search .................. 24/615, 24/625, 614, 616, 606; 340/573.4, 573.1; 224/240
See application file for complete search history.

(56) References Cited

U.S. PATENT DOCUMENTS

| | | | | |
|---|---|---|---|---|
| 3,781,497 A | * | 12/1973 | Stephenson et al. | 200/61.58 B |
| 4,300,129 A | | 11/1981 | Cataldo | 340/539 |
| 5,222,279 A | * | 6/1993 | Frano et al. | 24/625 |
| 5,295,490 A | * | 3/1994 | Dodakian | 600/534 |
| 5,343,008 A | * | 8/1994 | Ipcinski | 200/302.2 |
| 5,408,220 A | | 4/1995 | Brown et al. | 340/571 |
| 5,541,579 A | * | 7/1996 | Kiernan | 340/573.1 |
| 5,794,316 A | * | 8/1998 | Anscher | 24/625 |
| D397,641 S | * | 9/1998 | Hamilton et al. | D11/216 |
| 5,920,260 A | | 7/1999 | Tseng | 340/571 |
| 5,928,157 A | * | 7/1999 | O'Dwyer | 600/534 |
| 6,076,239 A | | 6/2000 | Kopetzky | 24/633 |
| 6,093,900 A | * | 7/2000 | Wisskirchen et al. | 200/302.2 |
| 6,188,033 B1 | * | 2/2001 | Bentley et al. | 200/468 |
| 6,474,435 B1 | | 11/2002 | Devereaux | 180/270 |
| 6,809,640 B1 | * | 10/2004 | Sherman | 340/457.1 |
| 2001/0025403 A1 | | 10/2001 | Kanbe et al. | 24/633 |
| 2002/0153189 A1 | | 10/2002 | Young | 180/268 |

FOREIGN PATENT DOCUMENTS

WO    WO 88/05579    7/1988

* cited by examiner

*Primary Examiner*—Jack W. Lavinder
(74) *Attorney, Agent, or Firm*—Mark W. Croll; Paul F. Donovan

(57) ABSTRACT

A multi-part closure provides remote indication of a secured or unsecured state of the closure. The closure includes first and second mating members that when engaged define a secured state and when disengaged define an unsecured state. A self-contained transmitter is disposed in the first member. A switch is disposed in the first member in electrical communication with the transmitter. The switch is positioned within the first member for engagement by the second member when the first and second members are mated with and secured to one another. A remote receiver provides indication of the engage or disengaged state of the first and second members.

10 Claims, 2 Drawing Sheets

SMART CLOSURE

CROSS-REFERENCE TO RELATED APPLICATION DATA

This application claims the benefit of priority of U.S. Provisional Patent Application Ser. No. 60/403,932 filed Aug. 16, 2002 and U.S. Provisional Patent Application Ser. No. 60/431,419 filed Dec. 6, 2002.

BACKGROUND OF THE INVENTION

The present invention is directed to a closure. More particularly, the present invention is directed to a safety closure that provides remote indication of the state or condition of the closure.

Closures such as buckles, snaps, hooks, latches and the like are used in a wide variety of applications. For example, one such type of closure, e.g., buckles are used in connection with backpacks, belts, child safety seats, strollers and the like. Some of these applications, such as child safety seats and strollers are safety or safety-related applications.

With respect to safety and safety-related closure applications such as child safety seats and strollers, failure to properly secure the closure or failure to properly monitor the state or condition of the closure is of interest to a user.

While closure monitoring is known for certain types of closures, e.g., automotive seat belt latches, these monitoring systems use either mechanical linkages or electrical hard-wired arrangements to effect remote indication. These linkages and hard-wire configurations, are, however, relatively large in size, typically require external power sources (for the hard-wired systems) and can be quite costly.

Accordingly, there is a need for a closure that provides remote indication of the state or condition of the closure. Desirably, such a closure provides indication through wireless transmission, without mechanical linkages or electrical hard-wiring. Indication can be provided by, for example, an audible, visual or vibratory signal.

BRIEF SUMMARY OF THE INVENTION

A multi-part smart closure provides remote indication of the state or condition of the closure. Such a closure provides indication without mechanical linkages or electrical hard-wiring. Indication can be provided by, but is not limited to, an audible, visual or vibratory signal. The smart circuitry can be incorporated into a wide variety of closures, such as buckles, clasps and the like.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
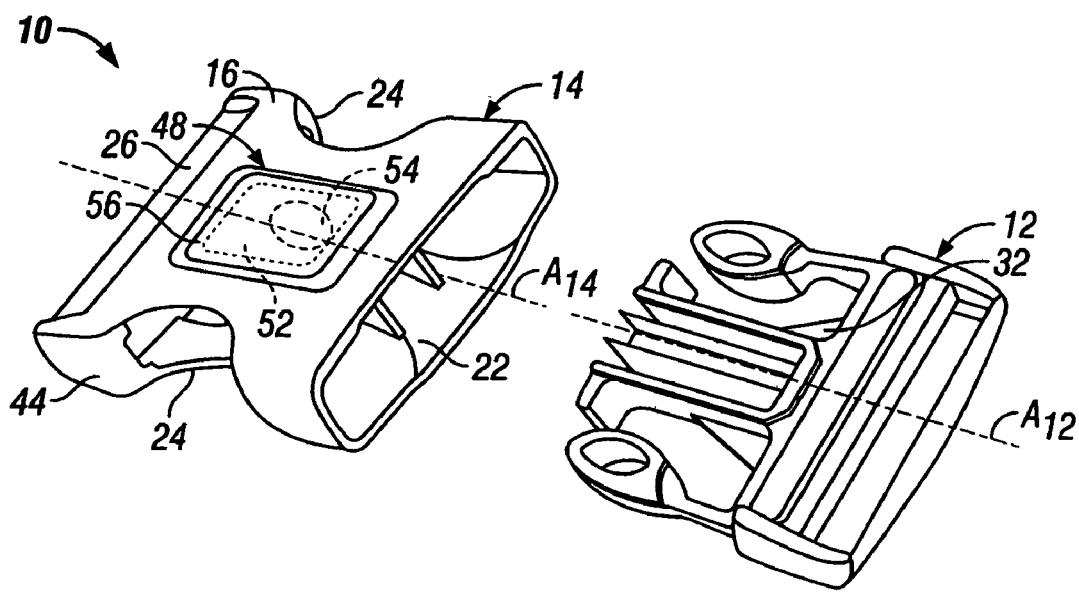
FIG. 1 is a perspective view of a smart closure embodying the principles of the present invention, the exemplary closure structure shown being a two-piece buckle.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Figure 2:
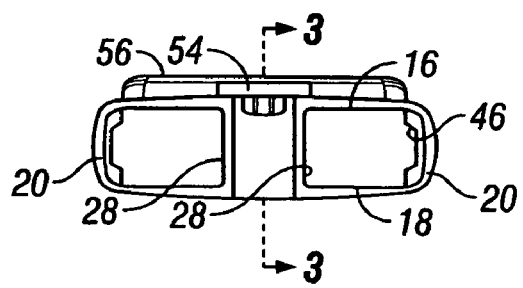
FIG. 2 is a front view of the female, receptacle portion of the buckle.
Figure 3:
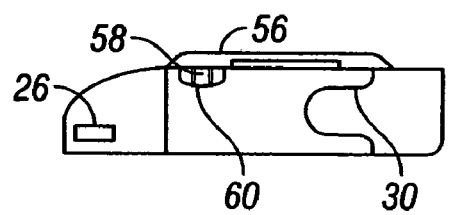
FIG. 3 is a partial cross-sectional view of the female buckle portion taken along line 3-3 of FIG. 2.

Referring now to the figures and in particular to FIG. 1, there is a shown remote indication (smart) closure 10 embodying the principles of the present invention. The closure 10 is exemplified by the illustrated two-part buckle assembly having mating members, e.g., a male (insert) closure member 12 and a female (receptacle) closure member 14. As seen in FIGS. 2 and 3, in a typical arrangement, the female member 14 includes top and bottom walls 16, 18 and side walls 20 that define a generally rectangular shaped interior channel 22 (FIG. 1). Apertures 24 are formed at a rear end of the female member 14 (beyond the side walls) that are contiguous with the interior channel 22. A farthest or distal end of the female member 14 includes one or more slot-like openings 26 for receiving a strap or belt-like element. In one embodiment, such as that illustrated, the female member interior channel 22 is partially separated from the apertures 24 by interior partition walls 28 (FIG. 2). The partition walls 28 can include windows or open portions 30 (FIG. 3) for receiving structural portions (e.g., gussets 32) of the male member 12.

Figure 4:
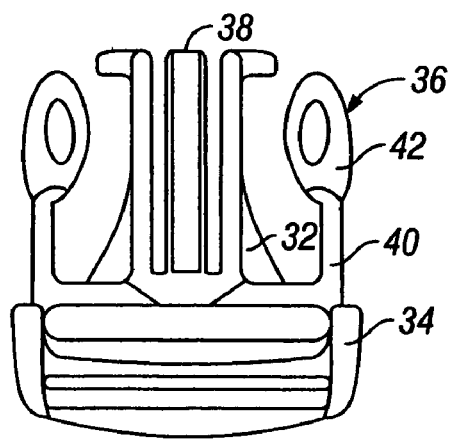
FIG. 4 is a top view of the male, insert portion of the buckle.

Referring now to FIGS. 1 and 4, the male member 12 includes a base portion 34 and a pair of flexible arm members 36 extending from the base portion 34. The arms 36 are elongated and are flexible to permit bending or flexing the arms toward and away from a centerline $A_{12}$ of the male member 12. A central guide element 38 extends in generally the same direction as the arms 36, along the centerline $A_{12}$ of the male element 12. The central guide element 38 is configured for receipt in the interior channel or groove 22 formed in and along the longitudinal center $A_{14}$ of the female member 14.

The arms 36 each include an elongated main portion 40 and an enlarged, rounded protrusion 42 at a distal end thereof. When the male member 12 is inserted in to the female member 14, the protrusions 42 are configured to engage a wall or surface 44 forming a part of the aperture 24 to lock the male member 12 (at the arms 36) to the female member 14. As can be seen in FIGS. 1 and 2, the arm main portions 40 (which are smaller than their respective protrusions 42) ride in channels 46 (FIG. 2) in the wall surfaces 44 in which the protrusions 42 do not fit or insert because of their larger size. Thus, the protrusions 42 are prevented from being "pulled" from the apertures 24 by engagement of the arm main portions 40 in the channels 46. Any of a variety of angled surfaces, lips and/or shoulders can be used to assure engagement and locking of the male 12 and female 14 members to one another. Examples of such configurations are disclosed in Frano et al., U.S. Pat. No. 5,222,279, and Hamilton, et al., U.S. Pat. No. Des. 397,641, both of which patents are commonly assigned with the present application and are incorporated herein by reference.

A present smart closure 10 provides remote indication of the state or condition of the closure 10 by use of wireless microelectronic transmission and receiving components. A present closure uses an RF transmitter/encoder 48 and an RF receiver/decoder 50 (FIG. 5) in combination with the structural components of the closure 10. As best seen in FIG. 1, the transmitter 48 is mounted to (or within) the female member 14. In a present embodiment, the transmitter 48 is a fully self-contained unit (circuit board 52) having a power supply, such as a battery 54. The transmitter 48 can be positioned within the member 14 such that the battery 54 can be replaced, the battery can be recharged, or the battery (and that is the entirety of closure 10) is disposable. As illustrated, a covering portion 56 can be configured for removal for access to the battery 54 for replacement.

A switch 58 is operably connected to the transmitter unit 48. The switch 58 is positioned within the female member 14 so that it is engaged, i.e., actuated, by a portion of the male member 12 when the male member 12 is properly inserted into the female member 14. The switch 58 energizes/deenergizes a circuit within the transmitter 48. RF signal(s) are then received by the receiver 50 to provide indication of proper engagement of the male 12 and female 14 closure members. In contrast, in the event that the closure 10 is not properly closed (e.g., the male member 12 is not properly inserted into the female member 14), the transmitter 48 fails to transmit a signal (or otherwise undergoes a change in state) which alerts a user to the improper condition of the closure 10.

Preferably, the switch 58 is a sealed-type switch, such as a sealed push-button switch. The mechanical portions of the switch 58 are within a sealed or controlled environment. For example, the switch can be within a sealed or isolated chamber in the female portion 14 that is "covered" by a rubber or polymer covering 60 (FIG. 3). The covering 60 is sufficiently resilient or soft so that the switch 58 is readily contacted (to change switch state) but is protected from environmental conditions. In that one anticipated use is in connection with juvenile products, it is envisioned that such an environmentally sealed switch 58 will have a longer useful life than an otherwise non-sealed switch.

As seen in FIGS. 1 and 4, the central guide portion 38 of the male member 12 is configured for contact with the switch 58 (when the male 12 and female 14 members are engaged) to energize the transmitter 48 circuit. Conversely, when the male member 12 is removed from (or not properly inserted into) the female member 14, the transmitter 48 circuitry is deenergized (or otherwise undergoes a change in state) providing indication of an open closure 10 condition.

Figure 5:
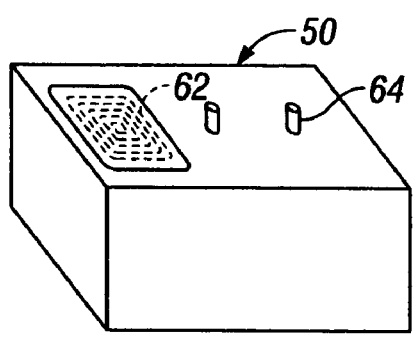
FIG. 5 illustrates an exemplary receiver unit for the smart closure.

With reference to FIG. 5, the receiver 50 can be connected to audible (horns or speakers 62), visual (LED or other lights 64) or vibratory signal indicators, which signal indicators are exemplary only and are not to be considered limiting in any way. It is also anticipated that circuitry can be employed so that the transmitter 48 circuit "samples" the closure 10 state, rather than constantly monitoring that state to extend battery 54 life. In addition, the use of the numerous RF channel combinations that are available will reduce the opportunity for interference and crosstalk when the smart closure 10 is used near other smart closures.

Figure 6:
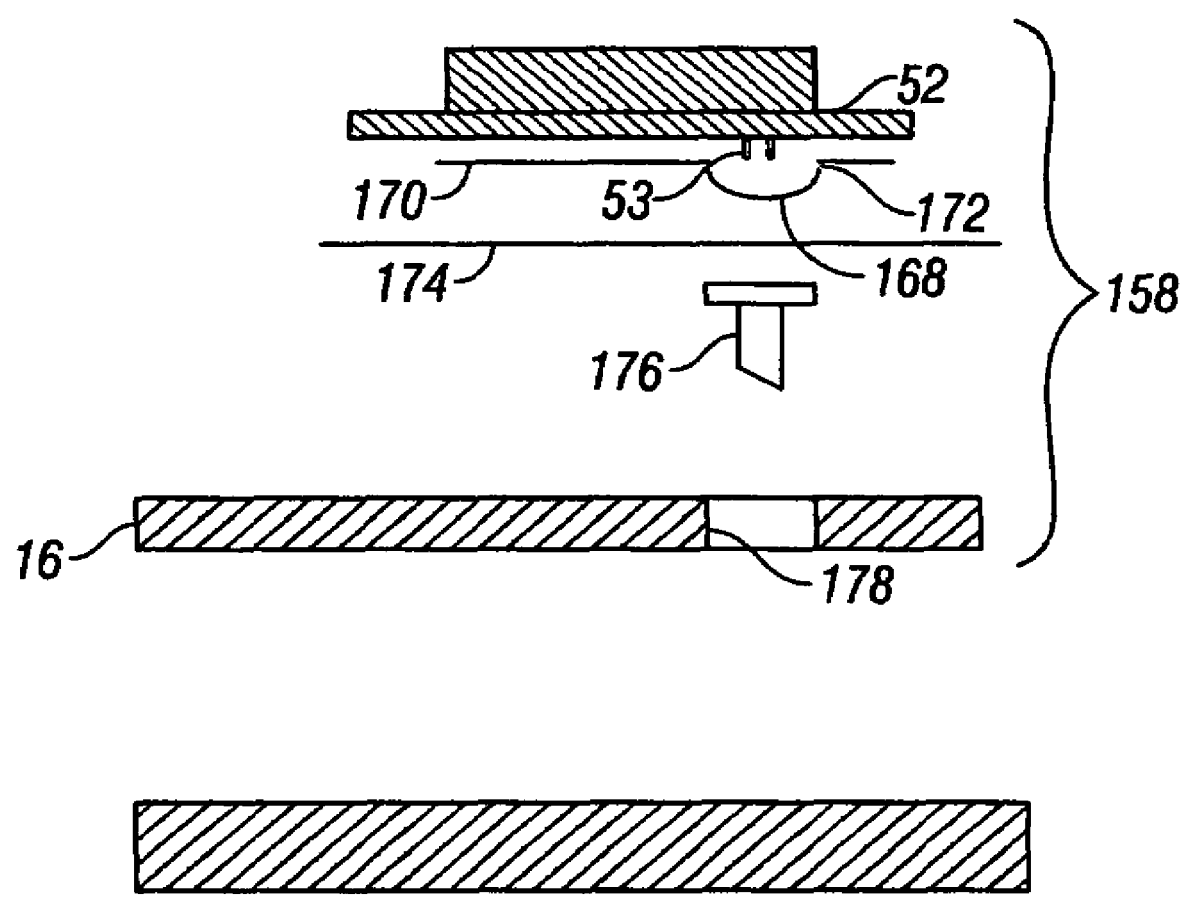
FIG. 6 is a cross-sectional illustration of an exemplary switch for use with the present smart closure.

Another switch arrangement 158 is illustrated in FIG. 6. The switch 158 is used to actuate circuitry on the circuit board 52. The switch 158 includes an electrically conductive flexible dome switch element 168 that is affixed to, but electrically isolated from, the circuit board 52 by, for example, a section of 2-faced tape 170 with a die cut opening (indicated at 172) under the dome 168. In this arrangement, flexing the dome 168 toward the circuit board 52 brings the dome 168 into contact with contacts 53 on the circuit board 52 to "change" the state of the switch 158. Conversely, unflexing (by releasing) the dome 168, terminates switch 158 contact.

A flexible membrane seal 174, such as a linear low density polyethylene (LLDPE) or other suitable elastomer sheet is affixed over the dome 168. A plunger 176 is positioned in an opening 178 in the female buckle member wall 16 (over the seal 174), to overlie the dome 168. In this manner, the plunger 176 is driven by engagement of the male and female members 12, 14 to contact the flexible seal member 174 overlying the dome 168. This urges the dome 168 into contact with the electrical contacts 53 on the circuit board 52, changing the state of the switch 158.

In a present closure 10, the transmitter 48 is a transmitter with integral encoder such as that commercially available from Linx Technologies, Inc., of Grants Pass, Oreg. under product code TXE-418-KH and the receiver 50 is a receiver with integral decoder such as that commercially available from Linx Technologies, Inc. under product code RXD-418-KH. Other transmitters and receivers will be recognized by those skilled in the art and are within the scope and spirit of the present invention.

Those skilled in the art will appreciate that although the present smart closure 10 circuitry is described and disclosed with respect to a two-part buckle closure 10, the present invention can be provided within any multi-part closure, such as clasps, snaps and the like, which other multi-part closures are within the scope and spirit of the present invention.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A multi-part closure that provides remote indication of a secured or unsecured state of the closure, comprising:
   a two-part buckle including first and second mating members, the members defining a secured state when the members are mated with and secured to one another and an unsecured state when the members are not mated with and not secured to one another, wherein the first member defines an opening having a plunger positioned therein;
   a wireless self-contained transmitter disposed in the first member;
   a hermetically sealed switch in electrical communication with the transmitter, the switch having a movable portion and being positioned such that mating the first and second members with one another moves the movable portion and changes a state of the switch, wherein the switch is aligned with the plunger;

a flexible covering extending over the switch and isolating the movable portion of the switch to prevent the ingress of contaminants into the switch; and, a wireless remote receiver, wherein when the first and second members are in mating engagement with one another, the second member drives the plunger up and the switch changes state, and wherein the change in the state of the switch is indicated by the remote receiver, and wherein the remote receiver provides indication of the members being in the secured state and indication of the members being in the unsecured state.

2. The multi-part closure in accordance with claim 1 wherein the switch is disposed in the first member and is positioned for engagement by the second member when the first and second members are engaged with one another.

3. The multi-part closure in accordance with claim 1 wherein the transmitter includes a battery.

4. The multi-part closure in accordance with claim 1 wherein the remote receiver provides visual indication of the state of the members.

5. The multi-part closure in accordance with claim 1 wherein the remote receiver provides audible indication of the state of the members.

6. The multi-part closure in accordance with claim 1 wherein the remote receiver provides vibratory indication of the state of the members.

7. A buckle closure that provides remote indication of a secured or unsecured state of the closure, comprising:

a female receptacle member having top and bottom walls and side walls defining an interior channel defining an interior channel including a central channel the female receptacle member having apertures formed at a rear end thereof contiguous with the interior channel;

a wireless self-contained transmitter disposed in the female receptacle member;

a hermetically sealed switch in electrical communication with the transmitter, the switch including a resilient element extending over a plunger portion of the switch to isolate the plunger portion of the switch from the environs;

a male insert member configured for receipt in the female receptacle member, the male insert member including a base portion and a pair of flexible arms extending from the base portion, the arms configured for flexing toward and away from a centerline of the male member, the male member including a plunger spaced from and between the flexible arms, the male member including a switch engaging element formed as a central guide element extending along the centerline of the male element; and a remote receiver, wherein the male member is inserted into the female member for secure engagement therewith by locking of the flexible arms in the apertures and wherein engagement of the male and female members with one another moves the plunger into contact with the switch to change a state of the switch by urging the plunger with the resilient element disposed between the plunger and the male member, the change of state of the switch being indicated by the remote receiver; and wherein the switch is disposed in the female receptacle member extending at least in part in to the interior channel, the switch being a two state switch, having a locked state when the members are securely engaged and an unlocked state when the members are not securely engaged so that, when in the locked state, the transmitter automatically sends a signal to the remote receiver without calculation, and wherein the remote receiver provides indication of the members being in the secured state and indication of the members being in the unsecured state.

8. The buckle closure in accordance with claim 7 wherein the transmitter includes a battery.

9. The buckle closure in accordance with claim 7 wherein the remote receiver provides audible indication of the state of the members.

10. The buckle closure in accordance with claim 7 wherein the remote receiver provides vibratory indication of the state of the members.

* * * * *